United States Patent [19]

Lindlbauer

[11] Patent Number: 5,203,598
[45] Date of Patent: Apr. 20, 1993

[54] WASTE SCOOPER APPARATUS

[76] Inventor: Karl W. Lindlbauer, P.O. Box 574, Stratton, Vt. 05155

[21] Appl. No.: 848,074

[22] Filed: Mar. 9, 1992

[51] Int. Cl.$^5$ .......................... A01K 29/00; E01H 1/12
[52] U.S. Cl. ................................................. 294/1.4
[58] Field of Search ................................. 294/1.3–1.5, 294/11, 19.1, 22, 50.8, 50.9, 104, 115

[56] References Cited

U.S. PATENT DOCUMENTS

| | | | |
|---|---|---|---|
| 875,078 | 12/1907 | Hoover | 294/22 |
| 944,214 | 12/1909 | Rydquist | 294/22 |
| 1,087,649 | 2/1914 | Fournet et al. | 294/22 |
| 3,446,525 | 5/1969 | Jones | 294/1.4 |
| 3,738,697 | 6/1973 | Kahan | 294/1.4 |
| 4,398,759 | 8/1983 | Manola | 294/1.4 |
| 4,647,094 | 3/1987 | Bergkvist et al. | 294/19.1 X |
| 4,669,769 | 6/1987 | Polder | 294/19.1 |

FOREIGN PATENT DOCUMENTS 2069 5/1979 European Pat. Off. ............. 294/1.4

Primary Examiner—Johnny D. Cherry
Attorney, Agent, or Firm—Leon Gilden

[57] ABSTRACT

A sanitary scooper is arranged to include a handle mounted at an oblique angle relative to a support tube, with the support tube mounting a control head at its forward distal end. The control head includes a pivot head rotatably mounting first and second actuator arms, wherein the handle includes a trigger lever, and upon depressing, the trigger lever effects projection of the first and second actuator arms towards one another, with a "V" shaped support frame mounted to the actuator arms and a support bag member mounted to the support frame to enclose waste and debris therewithin.

4 Claims, 5 Drawing Sheets

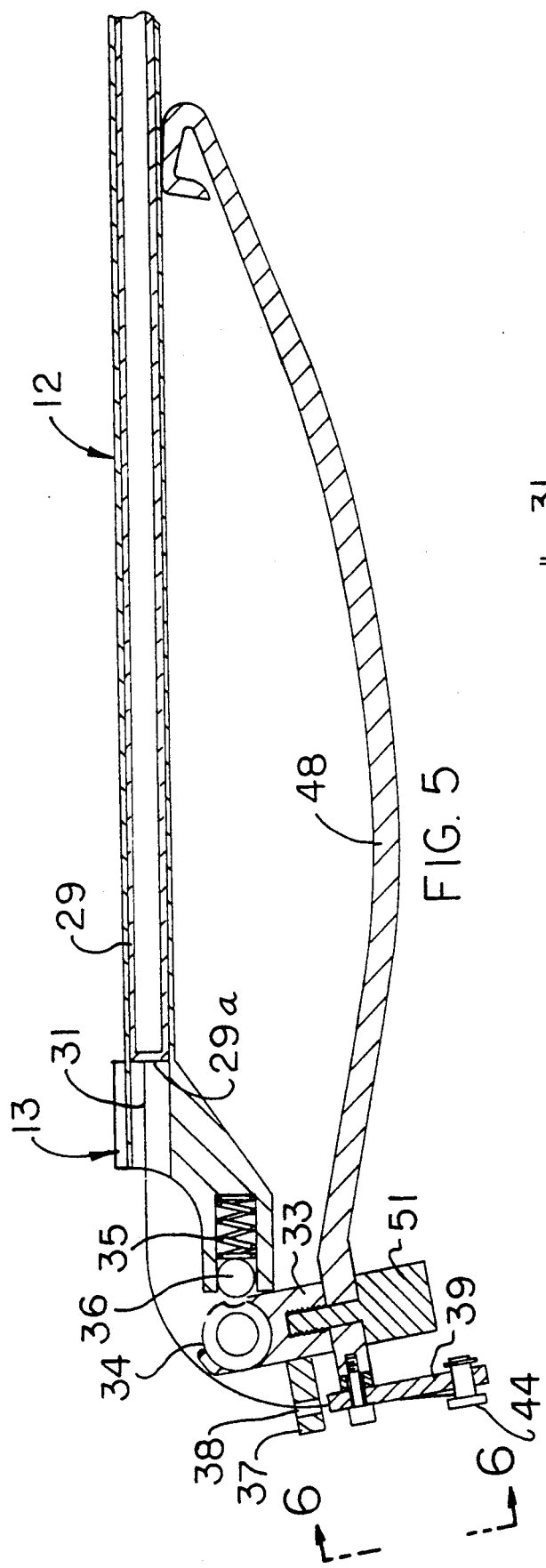
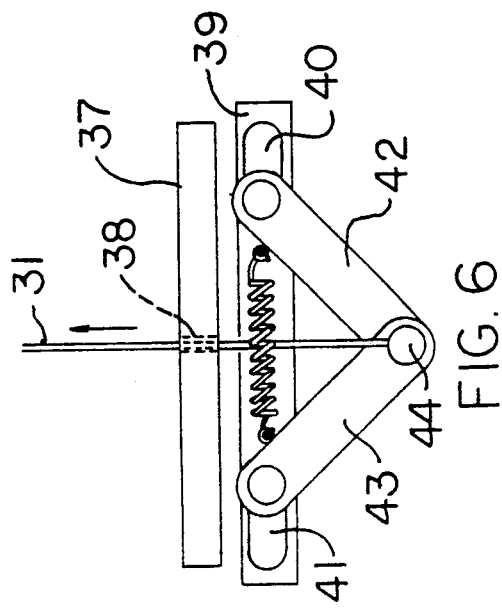

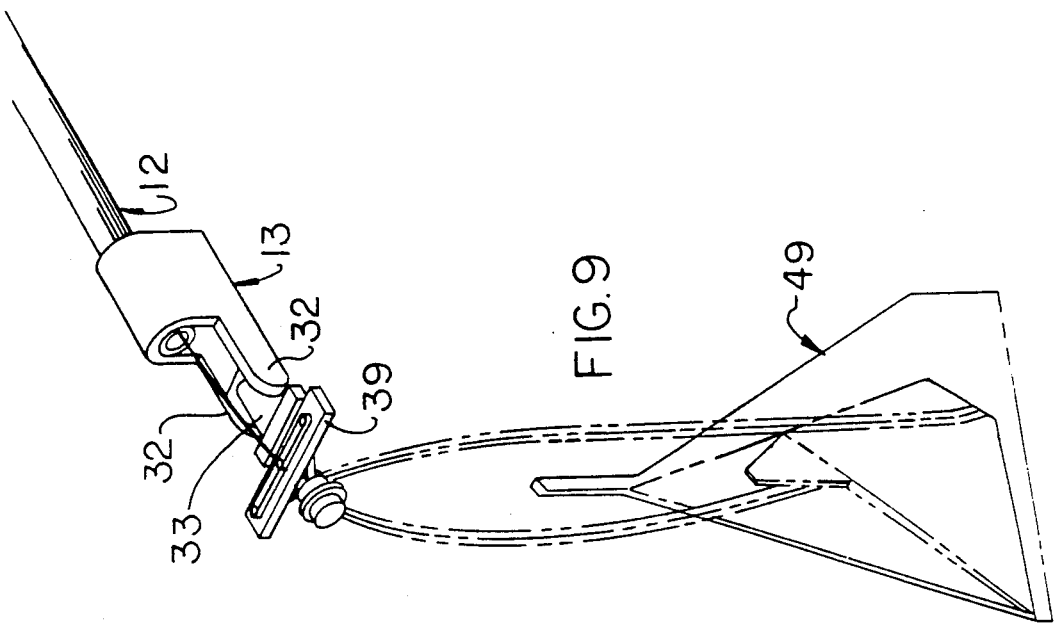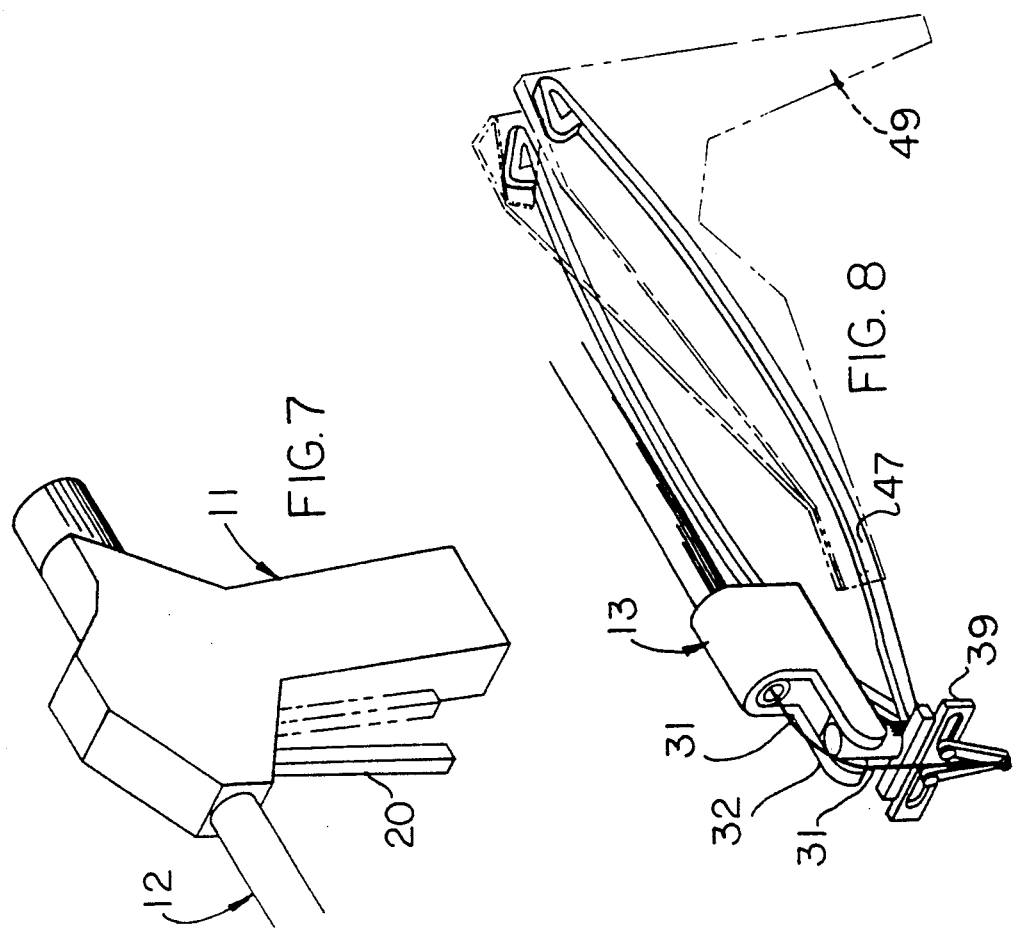

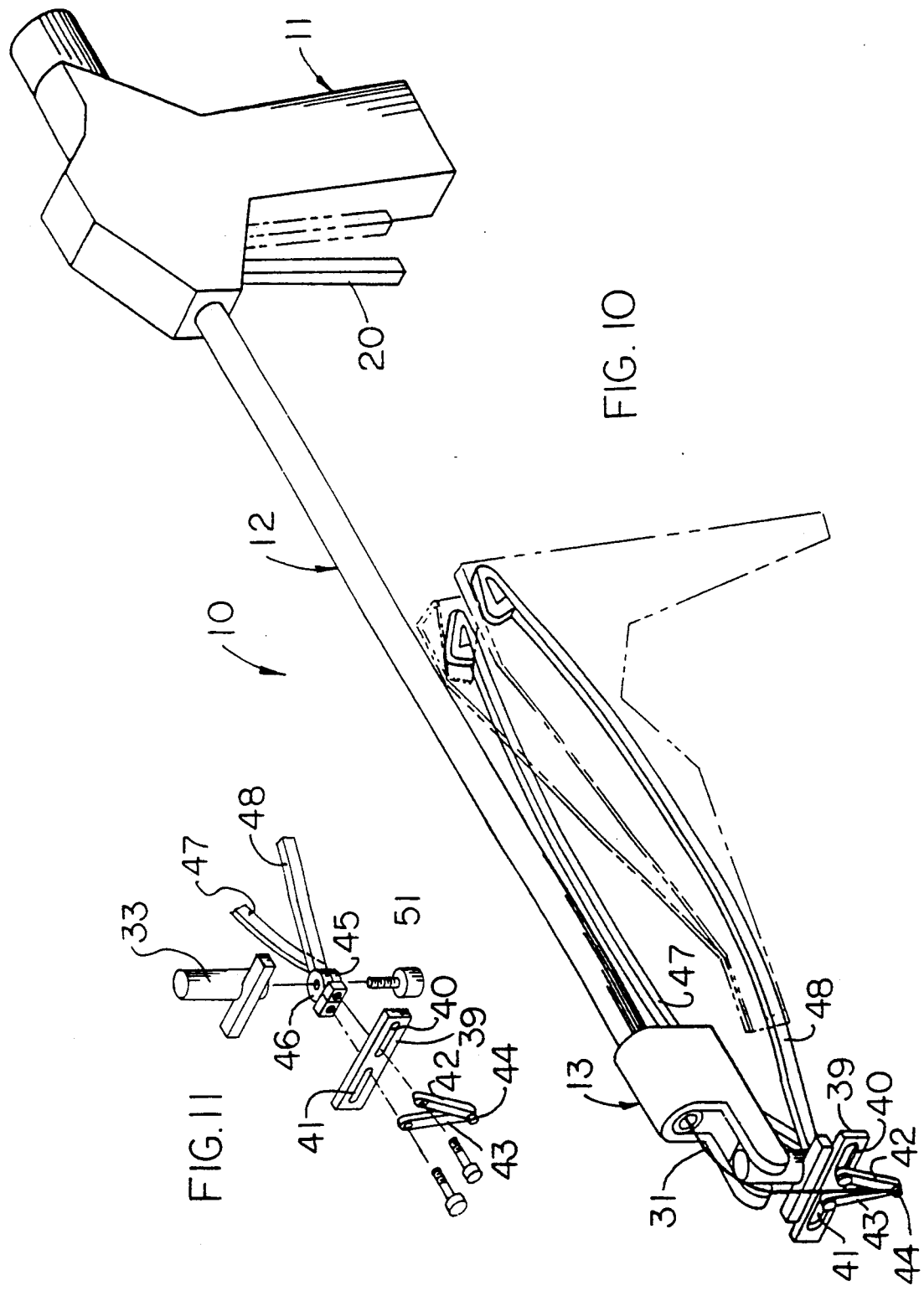

WASTE SCOOPER APPARATUS

BACKGROUND OF THE INVENTION

1. Field of the Invention

The field of invention relates to scooper apparatus, and more particularly pertains to a new and improved waste scooper apparatus wherein the same is arranged for the capturing of waste, and particularly animal waste such as dogs and the like, within a support frame and associated bag member.

2. Description of the Prior Art

Scooper structure has been available in the prior art to receive and secure animal waste therewithin. Such animal waste removal is frequently mandated by local ordinance and code. Prior art examples of scooper structure are set forth in the U.S. Pat. Nos. 4,335,678 and 4,718,707 utilizing various bag structures arranged to receive animal waste therewithin.

The U.S. Pat. No. 3,977,715 to Casci sets forth a further example of a kit mounting a bag at its lower end to receive animal waste therewithin.

The prior art has accordingly been of an organization limiting the enclosing structure relative to the animal waste to permit animal waste to be difficult in its lifting and removal.

The instant invention attempts to overcome deficiencies of the prior art by providing for a waste scooper apparatus wherein the same addresses both the problems of ease of use as well as effectiveness in construction in securing animal waste therewithin for its removal and disposal.

SUMMARY OF THE INVENTION

In view of the foregoing disadvantages inherent in the known types of scooper apparatus now present in the prior art, the present invention provides a waste scooper apparatus wherein the same utilizes a handle and trigger assembly arranged for remote actuation of actuator arms that in turn effect enclosing of a support frame about animal waste. As such, the general purpose of the present invention, which will be described subsequently in greater detail, is to provide a new and improved waste scooper apparatus which has all the advantages of the prior art scooper apparatus and none of the disadvantages.

To attain this, the present invention provides a sanitary scooper arranged to include a handle mounted at an oblique angle relative to a support tube, with the support tube mounting a control head at its forward distal end. The control head includes a pivot head rotatably mounting first and second actuator arms, wherein the handle includes a trigger lever, and upon depressing, the trigger lever effects projections of the first and second actuator arms towards one another, with a "V" shaped support frame mounted to the actuator arms and a support bag member mounted to the support frame to enclose waste and debris therewithin.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved waste scooper apparatus which has all the advantages of the prior art scooper apparatus and none of the disadvantages.

It is another object of the present invention to provide a new and improved waste scooper apparatus which may be easily and efficiently manufactured and marketed.

It is a further object of the present invention to provide a new and improved waste scooper apparatus which is of a durable and reliable construction.

An even further object of the present invention is to provide a new and improved waste scooper apparatus which is susceptible of a low cost of manufacture with regard to both materials and labor, and which accordingly is then susceptible of low prices of sale to the consuming public, thereby making such waste scooper apparatus economically available to the buying public.

Still yet another object of the present invention is to provide a new and improved waste scooper apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an orthographic side view of the support tube and control head structure utilized by the instant invention.

FIG. 6 is an orthographic view, taken along the lines 6—6 of FIG. 5 in the direction indicated by the arrows.

FIG. 7 is an isometric illustration of the handle structure relative to the support tube of the invention.

FIG. 8 is an isometric illustration of the control head mounted to the support tube of the instant invention.

FIG. 9 is an isometric illustration of the control head in a second operative position relative to animal waste to be removed.

FIG. 10 is an isometric illustration of the instant invention.

FIG. 11 is an isometric exploded illustration of the control head structure of the instant invention.

DESCRIPTION OF THE PREFERRED EMBODIMENT

Figure 1:
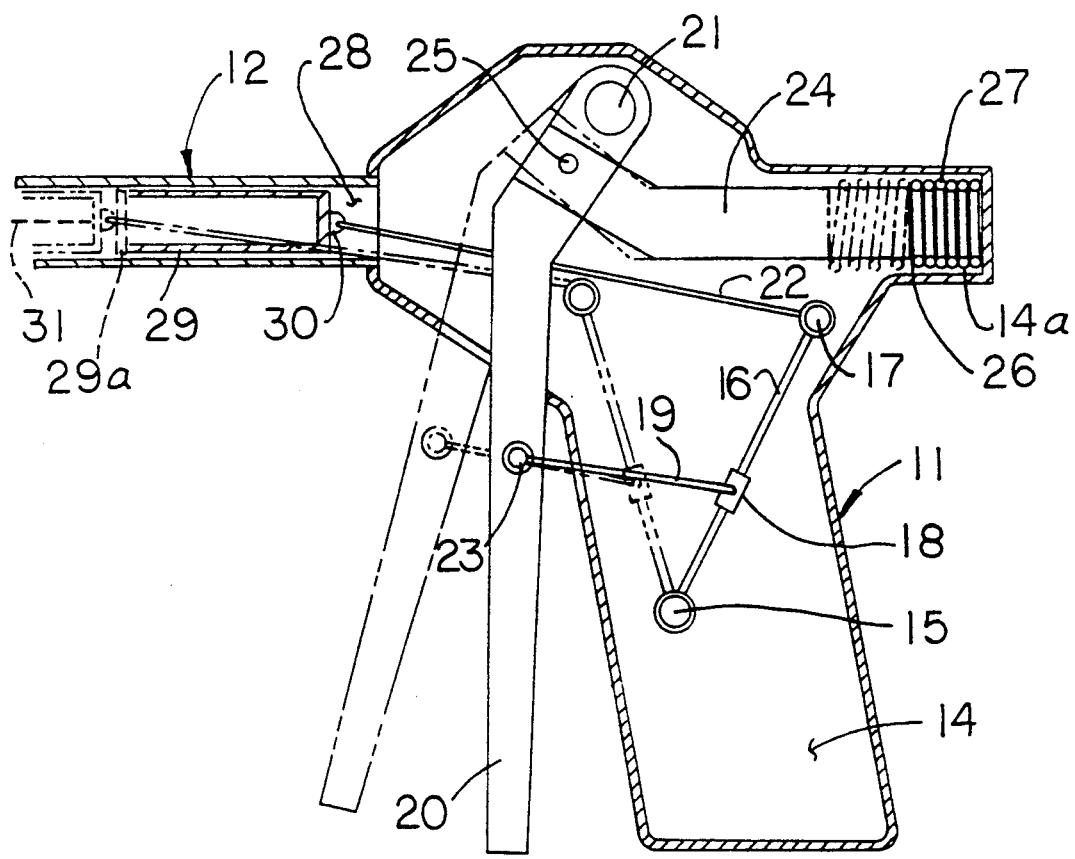
FIG. 1 is an orthographic cross-sectional illustration of the handle mounted to the support tube of the instant invention.
Figure 2:
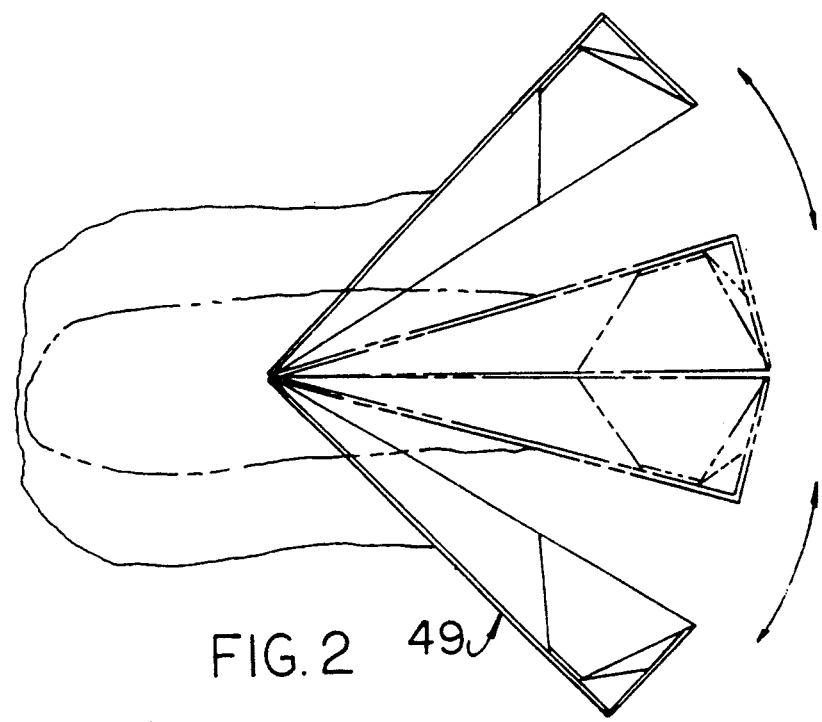
FIG. 2 is an orthographic top view of the support frame structure utilized in the enclosure of waste relative to the apparatus.
Figure 3:
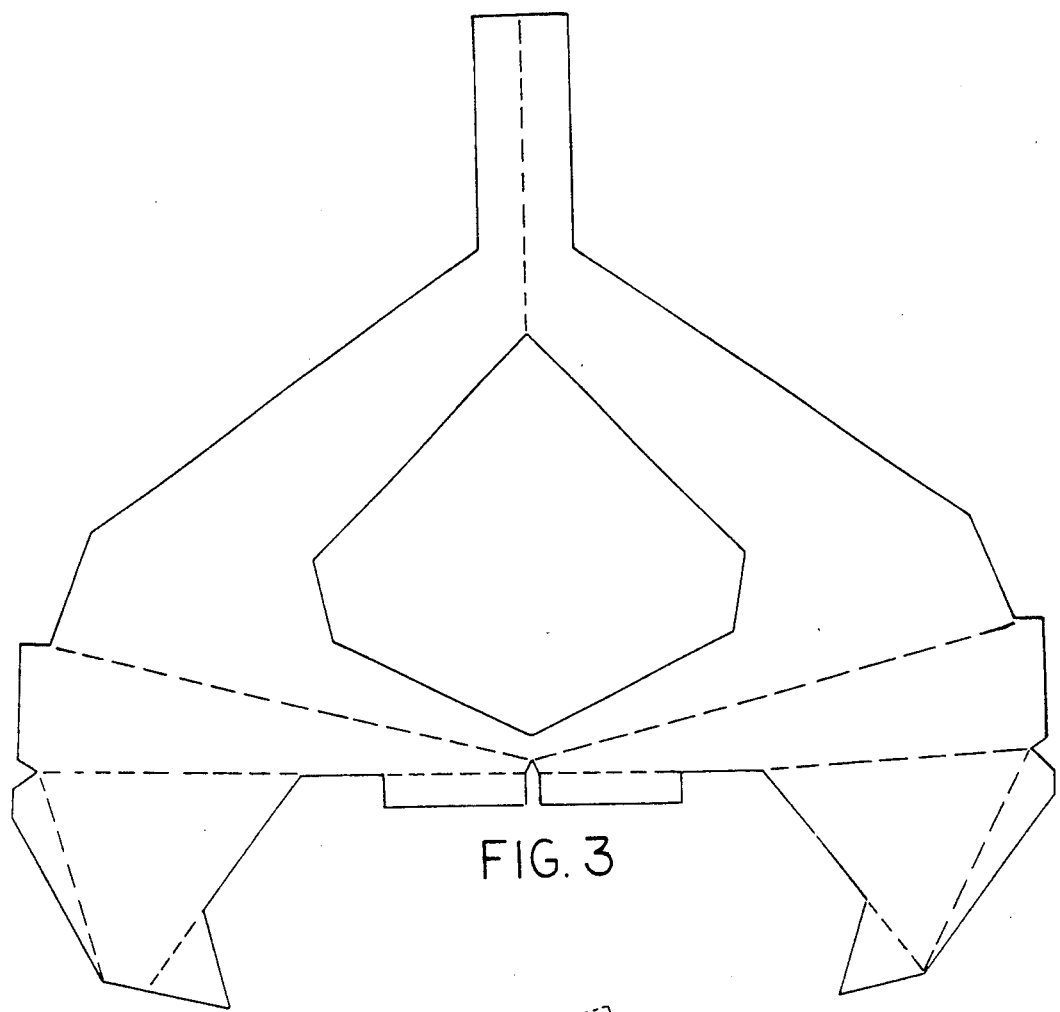
FIG. 3 is an orthographic plan view of the support frame structure in an opened configuration.
Figure 4:
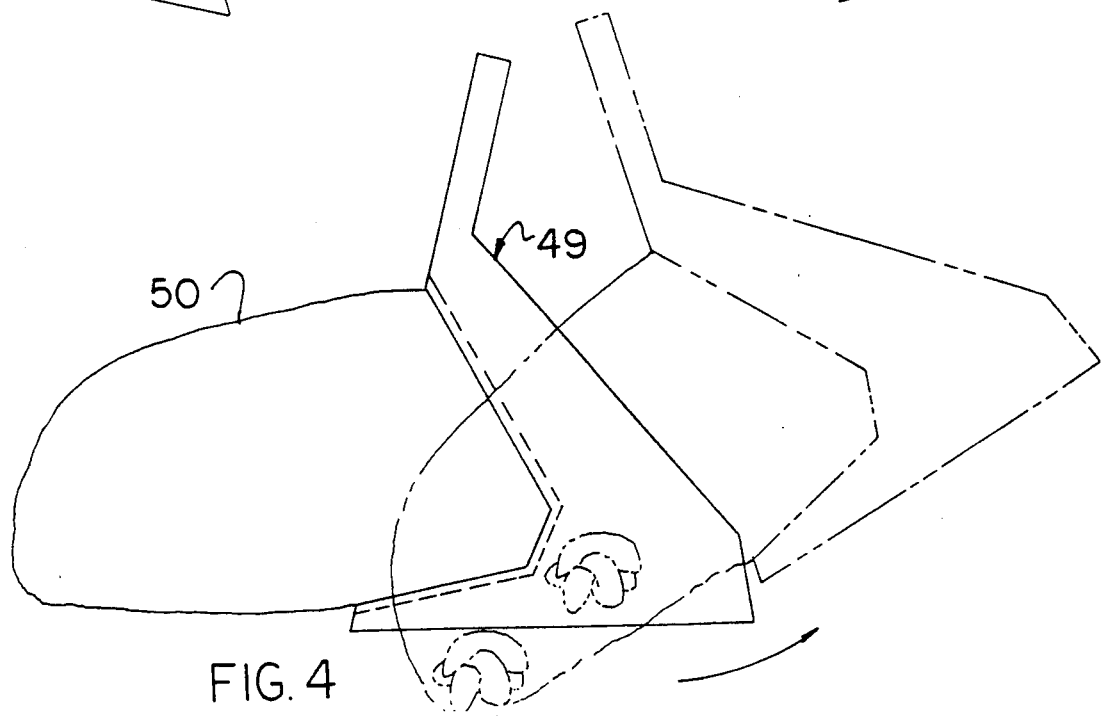
FIG. 4 is an orthographic side view of the support frame and associated bag member arranged for receiving animal waste therewithin.

With reference now to the drawings, and in particular to FIGS. 1 to 11 thereof, a new and improved waste scooper apparatus embodying the principles and concepts of the present invention and generally designated by the reference numeral 10 will be described.

More specifically, the waste scooper apparatus 10 of the instant invention essentially comprises a handle 11 fixedly mounted to a rear distal end of the support tube 12, with a forward distal end of the support tube 12 mounting a control head 13 thereon. The handle 11 is mounted at an oblique angular orientation relative to the support tube 12 in a spaced relationship relative to the control head 13, as illustrated in FIG. 10 for example.

With reference to FIG. 1, the handle 11 includes a handle chamber 14 formed with a first pivot axle 15 fixedly mounted within the handle chamber 14 mounting a pivot link 16 at its lower distal end. The pivot link 16 includes a second pivot axle 17 mounted at its upper distal end, with the pivot link 16 mounting a link mount 18 between the first and second pivot axles 15 and 17. The link mount secures a rear end portion of a trigger link 19 pivotally thereto, with the forward end of the trigger link 19 mounted to a trigger lever 20 substantially medially of an upper and lower distal end of the trigger lever. An upper distal end of the trigger lever 20 is mounted about a trigger lever pivot axle 21 within the handle chamber 14. A trigger cable 22 secured to the second pivot axle 17 extends through the chamber 14 and is secured to a slide cylinder 29, and more specifically to a slide cylinder boss 30 mounted to a rear wall of the slide cylinder. A forward wall 29a of the slide cylinder is mounted to a slide cylinder draw cable 31, such as illustrated in FIG. 1, and in relative proportion in the FIG. 5, as the draw cable 31 extends through the forward end of the support tube 12. A return arm 24 is mounted at a forward end of the return arm to a forward pivot joint 25 on the trigger lever 20 between the trigger lever pivot axle 21 and the third pivot axle 23. The return arm 24 includes a rear end portion received within a cylindrical handle chamber 14a directed through a rear wall of the handle 11, with the return arm rear end portion 26 mounted to a rear end portion spring 27 received within the cylindrical handle chamber 14a to normally bias the trigger lever 20 in a forwardly oriented position relative to the handle 11, as illustrated in phantom in FIG. 1.

The support tube 12 includes a support tube cylindrical cavity 28 receiving slidably the slide cylinder 29 therewithin, in a manner to indicate the foregoing orientation of the slide cylinder in FIG. 5.

The control head 13, see the FIGS. 5, 8, and 9 as examples, includes a plurality of control head parallel guide plates 32 extending forwardly of the control head and the support tube 12, with the plates 32 defining a gap therebetween mounting a pivot head 33 therebetween. The pivot head 33 cooperates with a pivot cylinder 34 mounted at an upper distal end of the pivot head orthogonally oriented relative to the pivot head 33, wherein the pivot cylinder 34 cooperates with a biasing spring 35 projecting a biasing spring roller 36 in engagement with the pivot cylinder 34 to bias the pivot cylinder 34 in a first lowered position, as illustrated in FIG. 5 and FIG. 8, permitting lifting of the pivot head 33 to a raised orientation or second position, as illustrated in FIG. 9. The second position illustrates the return orientation of the "V" shaped support frame 49 that is arranged to receive a bag member 50 (see FIG. 4 for example) to secure animal waste therewithin.

Guide plate 37 is fixedly and orthogonally mounted relative to the pivot head 33 and an axis defined by the pivot head 33, with the guide plate 37 including a guide plate bore 38 directed medially therethrough receiving slidably the draw cable 31 therethrough. An arm plate 39 fixedly mounted below and parallel to the guide plate 37 relative to the pivot head 33 includes an arm plate first slot 40 and an arm plate second slot 41 that are colinear relative to one another on opposed sides of the guide plate bore 38 (see FIG. 6 for example). The forward distal end of the draw cable 31 is secured to a slot axle 44 that in turn receives the lower distal ends in a pivotal relationship of the first and second slot arms 42 and 43 and at their upper distal ends are slidably mounted within the respective first and second slots 40 and 41. The first slot arm 42 is mounted to a first slot cylinder 45, with the second slot arm 43 mounted to a second slot arm cylinder 46. The first and second slot arm cylinders 45 and 46 are coaxially mounted about a slot arm cylinder fastener 51 (see FIG. 11), with the first slot arm cylinder 45 mounting a first actuator arm 47 and the second slot arm cylinder 46 mounting a second actuator arm 48. The first and second actuator arms 47 and 48 are arranged in a crossed relationship, as illustrated in FIG. 11, at their rear distal ends, with the forward distal ends projecting within the "V" shaped support frame 49. Upon depressing of the trigger 20, the draw cable 31 is tensioned, pivoting the actuator arms 47 and 48 and the associated "V" shaped frame 49 to the second position, as illustrated in FIG. 9, whereupon release of the handle effects projection of the structure to the orientation or first position, as set forth in the FIG. 8.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents any be resorted to, falling within the scope of the invention.

What is claimed as being new and desired to be protected by LETTERS PATENT of the United States is as follows:

1. A waste scooper apparatus, comprising,
    an elongate support tube, the support tube including a support tube first end and a support tube second end, the support tube first end including a handle fixedly mounted to the support tube first end at an oblique included angle therebetween, wherein the handle includes a handle chamber, and the handle chamber includes a trigger lever, the trigger lever including a trigger lever pivot axle positioned within the handle chamber at an upper distal end of the trigger lever, and
    the support tube including an elongate support tube cylindrical cavity directed coextensively through the support tube, with a slide cylinder slidably received within the cylindrical cavity, the slide cylinder including a slide cylinder rear wall, the slide cylinder rear wall including a trigger cable mounted to the slide cylinder rear wall, and wherein the trigger cable extends interiorly of the handle chamber, and
    linkage means mounted to the trigger lever and to the trigger cable to effect retraction of the slide cylinder within the support tube towards the handle upon displacement of the trigger lever towards the handle, and
    a control head mounted at the second end of the support tube, with the control head including a first actuator arm and a second actuator arm pivotally mounted relative to the control head, and
    a unitary support frame mounted to the first actuator arm and the second actuator arm, and
    a bag member mounted to the support frame.

2. An apparatus as set forth in claim 1 wherein the linkage means includes a first pivot axle fixedly mounted within the handle chamber, and a second pivot axle spaced from the first pivot axle, and a pivot link extending between the first pivot axle and the second pivot axle, and a linkage mount fixedly mounted to the pivot link between the first pivot axle and the second pivot axle, and a trigger link extending between the link mount and the trigger lever, and a forward distal end of the trigger link pivotally secured to the trigger lever about a third pivot axle, and the second pivot axle including the trigger cable secured thereto spaced from the slide cylinder.

3. An apparatus as set forth in claim 2 wherein the control head includes a plurality of parallel guide plates, and a pivot head pivotally mounted between the guide plates, and the pivot head including a pivot cylinder secured at an upper distal end of the pivot head, with the pivot cylinder pivotally mounted between the guide plates and the pivot head extending below the pivot cylinder, and a biasing spring contained within the control head, with a biasing spring roller secured to a forward distal end of the biasing spring, with the biasing spring roller arranged in abutment with the pivot cylinder to effect biasing of the pivot head in a first position oriented downwardly relative to the guide plates relative to a second position extending rearwardly of the guide plates.

4. An apparatus as set forth in claim 3 wherein the pivot head includes a trigger cable guide plate fixedly mounted to the pivot head spaced below the pivot cylinder, the trigger cable including a first end secured to a forward wall of the slide cylinder, and the trigger cable extending through the guide plate, with the guide plate including a guide plate bore receiving the trigger cable slidably therethrough, and arm plate arranged parallel and below the guide plate fixedly mounted to the pivot head, the arm plate including a first slot colinearly aligned with a second slot, the first slot and the second slot arranged on opposed sides of the guide plate bore below the guide plate bore through the arm plate, and the first slot including a first slot arm received within the first slot, and the second slot including a second slot arm received within the second slot, the first slot arm and the second slot arm secured about a slot axle below the arm plate and the trigger cable extending to the slot axle, with a lower distal end of the trigger cable secured to the slot axle spaced from the arm plate, and the frist slot arm secured to a first slot cylinder rearwardly of the arm plate, and the second slot arm secured to a second slot cylinder rearwardly of the arm plate, wherein the first slot cylinder and the second slot cylinder are coaxially aligned relative to one another, and the first slot cylinder includes a first actuator arm, and the second slot cylinder includes a second actuator arm, wherein the first actuator arm and the second actuator arm are projected within the support frame.

* * * * *